US010691478B2

(12) United States Patent
Fujii

(10) Patent No.: US 10,691,478 B2
(45) Date of Patent: Jun. 23, 2020

(54) MIGRATING VIRTUAL MACHINE ACROSS DATACENTERS BY TRANSFERRING DATA CHUNKS AND METADATA

(71) Applicant: FUJITSU LIMITED, Kawasaki-shi, Kanagawa (JP)

(72) Inventor: Kazuho Fujii, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 151 days.

(21) Appl. No.: 15/670,035

(22) Filed: Aug. 7, 2017

(65) Prior Publication Data
US 2018/0046491 A1 Feb. 15, 2018

(30) Foreign Application Priority Data
Aug. 15, 2016 (JP) ................................. 2016-159386

(51) Int. Cl.
*G06F 9/455* (2018.01)
*H04L 29/06* (2006.01)

(52) U.S. Cl.
CPC ........ *G06F 9/45558* (2013.01); *H04L 63/102* (2013.01); *G06F 2009/4557* (2013.01);
(Continued)

(58) Field of Classification Search
CPC ....... G06F 9/45558; G06F 2009/45575; G06F 2009/4557; G06F 2009/45583; G06F 2009/45595; H04L 63/102
See application file for complete search history.

(56) References Cited

U.S. PATENT DOCUMENTS 6,158,010 A * 12/2000 Moriconi .............. G06F 21/552
709/223
9,317,314 B2 * 4/2016 Reuther ................ G06F 9/4856
(Continued)

FOREIGN PATENT DOCUMENTS

JP 2013-093050 A 5/2013
JP 2014-503086 A 2/2014
(Continued)

OTHER PUBLICATIONS

Japanese Office Action dated Apr. 14, 2020 for corresponding Japanese Patent Application No. 2016-159386, with English Translation, 6 pages.

*Primary Examiner* — Benjamin C Wu
(74) *Attorney, Agent, or Firm* — Fujitsu Patent Center

(57) ABSTRACT

An information processing system includes first data center and second data center. The first data center includes first virtual machine server including first processor that executes virtual machine using an image file, first data server including second processor and first storage that stores a plurality of chunks, and first metadata server including third processor and second storage that stores metadata of the image file. The second data center includes a second virtual machine server including fourth processor, second data server including third storage and fifth processor, and second metadata server including sixth processor and fourth storage. The second processor transmits, to the second data center, a predetermined chunk of the plurality of chunks. The first processor stops the virtual machine after the predetermined chunk is transmitted. The third processor transmits the metadata to the second metadata server. The fourth processor activates the virtual machine.

5 Claims, 14 Drawing Sheets

(52) U.S. Cl.
CPC .............. *G06F 2009/45575* (2013.01); *G06F 2009/45583* (2013.01); *G06F 2009/45595* (2013.01)

(56) References Cited

U.S. PATENT DOCUMENTS

| | | | |
|---|---|---|---|
| 9,766,945 B2* | 9/2017 | Gaurav | G06F 9/5077 |
| 10,061,611 B2* | 8/2018 | Tarasuk-Levin | G06F 9/45558 |
| 2012/0192175 A1* | 7/2012 | Dorai | G06F 9/45558 718/1 |
| 2012/0259813 A1 | 10/2012 | Takata et al. | |
| 2013/0014103 A1* | 1/2013 | Reuther | G06F 3/0647 718/1 |
| 2014/0095816 A1* | 4/2014 | Hsu | G06F 3/0655 711/162 |
| 2014/0325507 A1* | 10/2014 | Freimuth | G06F 9/45558 718/1 |
| 2015/0169623 A1 | 6/2015 | Wu et al. | |
| 2016/0062779 A1* | 3/2016 | Tsirkin | G06F 9/4856 718/1 |
| 2016/0062851 A1 | 3/2016 | Sugabrahmam et al. | |
| 2016/0124665 A1* | 5/2016 | Jain | G06F 3/0685 711/162 |
| 2016/0378844 A1* | 12/2016 | Karve | G06F 16/27 707/620 |
| 2016/0380840 A1* | 12/2016 | Karve | H04L 67/1097 709/223 |
| 2017/0031710 A1* | 2/2017 | Kuik | G06F 9/4856 |
| 2018/0046823 A1* | 2/2018 | Durham | G06F 21/53 |
| 2018/0060117 A1* | 3/2018 | Maskalik | G06F 9/5077 |
| 2018/0349169 A1* | 12/2018 | Aasted | G06F 9/45558 |

FOREIGN PATENT DOCUMENTS

| | | |
|---|---|---|
| JP | 2015-528957 A | 10/2015 |
| JP | 2016-4432 A | 1/2016 |
| WO | 2012137262 A1 | 10/2012 |
| WO | 2014015782 A1 | 1/2014 |

* cited by examiner

| | 722 |
|---|---|
| FILE NAME | AAA |
| SERVER ID | BBB |

F I G. 5

| FILE NAME | AAA | | | 623-1 |
|---|---|---|---|---|
| CHUNK NUMBER | CCC | ... | ... |
| DATA OFFSET | DDD | ... | ... |
| DATA LENGTH | EEE | ... | ... |
| SERVER ID | FFF | ... | ... |

F I G. 6

| FILE NAME | AAA | | |
|---|---|---|---|
| CHUNK NUMBER | CCC | ... | ... |
| LEASE | YES/NONE | ... | ... |

624-1

FIG. 7

MIGRATING VIRTUAL MACHINE ACROSS DATACENTERS BY TRANSFERRING DATA CHUNKS AND METADATA

CROSS-REFERENCE TO RELATED APPLICATION

This application is based upon and claims the benefit of priority of the prior Japanese Patent Application No. 2016-159386, filed on Aug. 15, 2016, the entire contents of which are incorporated herein by reference.

FIELD

The embodiments discussed herein are related to an information processing system and an information processing method.

BACKGROUND

Performing tasks using a virtual desktop environment has become common. An advantage of the virtual desktop environment is that a user can use the same environment using any access client. Hence, the user can move from his/her office to a distant office without carrying a terminal and perform tasks using an access client belonging to the distant office.

In the prior art, however, virtual machines (VMs) are disposed in a single data center (DC), and there is a problem with the performance of a response from an access client to a VM when a user is distant from the DC. Accordingly, in accordance with the user's movement, the VM is transferred to a DC close to the user. To do this, a file system (FS) is shared between DCs distant from each other, so that an image file (VM image file) stored in a storage apparatus belonging to a VM can be accessed from any of the DCs. In particular, an FS distributed among DCs is used. An image file is generated by compiling a plurality of pieces of data stored in a storage apparatus. A VM is executed using a VM image file.

Data is frequently written to a VM image file while a VM is in operation. However, for the conventional distributed FS, communications are frequently performed between servers that form a cluster, so as to maintain integrity in writing data. Hence, when the conventional distributed FSs, for which long distances between servers are not considered, are distributed among DCs, it is difficult to achieve a practical performance for a response from an access client to a VM.

In a well-known distributed file system, a file catalog stored by a master server is accessed; routing information of a meta server associated with a file to be accessed is obtained from the master server; the meta server is accessed according to the routing information; the meta information of the file to be accessed is obtained from the meta server; and the file to be accessed is accessed from a plurality of node servers (see, for example, patent document 1).

While a VM image file is being transferred to transfer a VM between DCs, the operation of the VM is stopped.

Patent Document 1: Japanese National Publication of International Patent Application No. 2015-528957
Patent Document 2: Japanese Laid-open Patent Publication No. 2013-93050
Patent Document 3: Japanese National Publication, of International Patent Application No. 2014-503086

SUMMARY

According to an aspect of the invention, an information processing system includes a first data center and a second data center.

The first data center includes a first virtual machine server, a first data server, and a first metadata server.

The first virtual machine server includes a first processor that executes a virtual machine using an image file of a storage device belonging to the virtual machine.

The first data server includes: a first storage that stores a plurality of chunks that form the image file; and a second processor.

The first metadata server includes: a second storage that has metadata of the image file stored therein; and a third processor.

The second data center includes a second virtual machine server, a second data server, and a second metadata server.

The second virtual machine server includes a fourth processor that executes the virtual machine using the image file.

The second data server includes a third storage and a fifth processor.

The second metadata server includes: a fourth storage that has the metadata stored therein; and a sixth processor.

The second processor transmits, to the second data center, a predetermined chunk from among the plurality of chunks that corresponds to predetermined data stored in the storage device.

The fifth processor stores the predetermined chunk in the third storage.

After the predetermined chunk is transmitted, the first processor stops the virtual machine executed by the first processor.

The third processor transmits the metadata to the second metadata server.

The sixth processor stores the metadata in the fourth storage.

The fourth processor activates the virtual machine using the image file that includes the predetermined chunk stored in the third storage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 illustrates an example of super metadata;
FIG. 6 illustrates an exemplary allocation table from among metadata;
FIG. 7 illustrates an exemplary lock table from among metadata.

DESCRIPTION OF EMBODIMENTS

First, descriptions will be given of a situation in which a distributed file system is applied to a system that includes a plurality of data centers.

Figure 1:
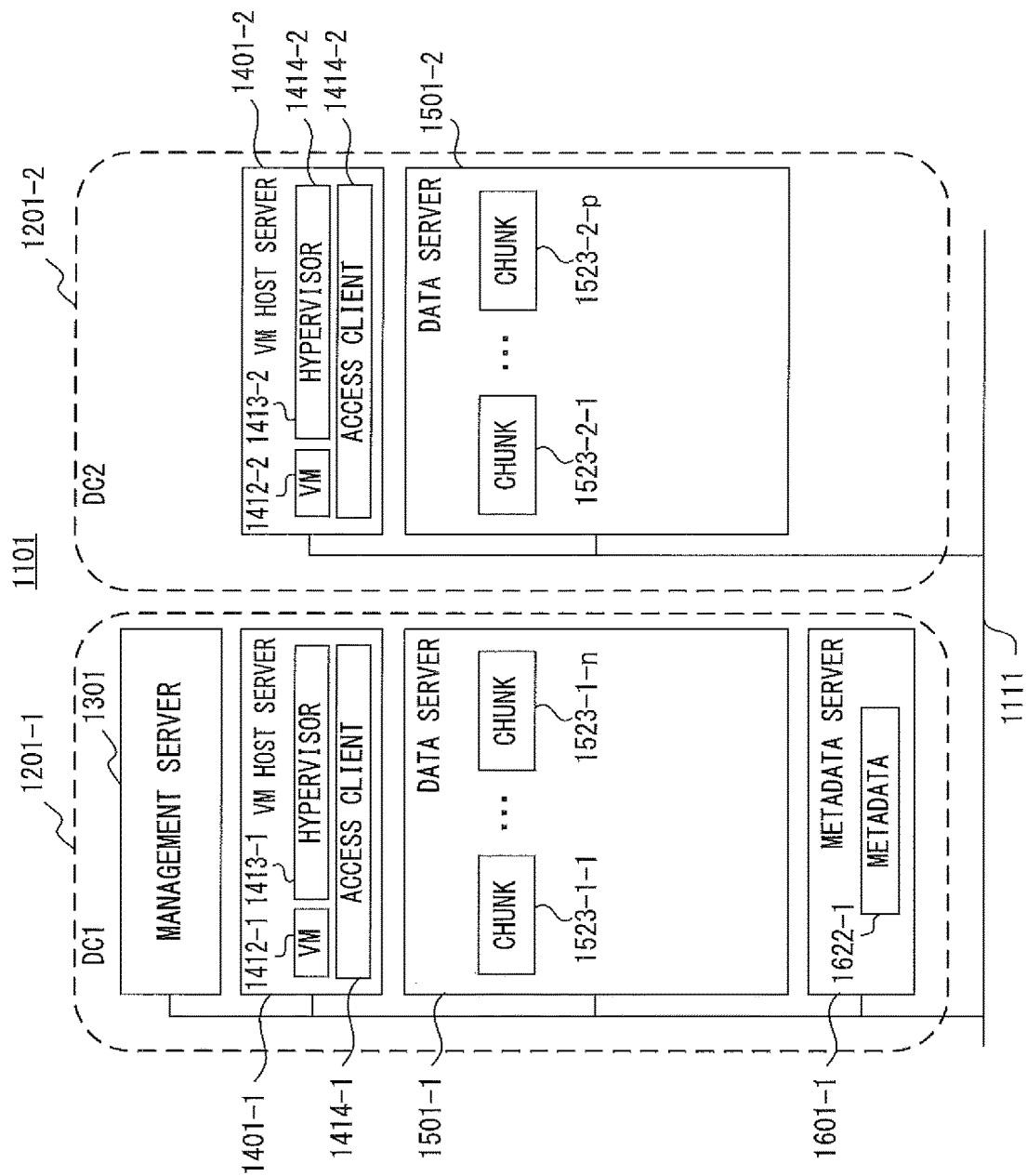
FIG. 1 is an exemplary configuration diagram of a distributed file system.

FIG. 1 is an exemplary configuration diagram of a distributed file system.

A distributed file system 1101 includes data centers (DCs) 1201-$i$ ($i$=1, 2). The data centers 1201-1 and 1201-2 may hereinafter be referred to as a DC1 and a DC2, respectively. The data centers 1201-1 and 1201-2 are connected over a network 1111.

The data center 1201-1 includes a management server 1301, a VM host server 1401-1, a data server 1501-1, and a metadata server 1601-1. The management server 1301, the VM host server 1401-1, the data server 1501-1, and the metadata server 1601-1 are connected over the network 1111.

The management server 1301 manages chunk transfer and like.

The VM host server 1401-1 executes a virtual machine (VM) 1412-1, a hypervisor 1413-1, and an access client 1414-1.

The data server 1501-1 has chunks 1523-1-$j$ ($j$=1 to n) stored therein. The chunks 1523-1-$j$ are each, a division of a file (data) that has a predetermined size.

The metadata server 1601-1 has stored therein metadata 1622-1 that is information on the file formed by the chunks 1523-1-$j$.

The data center 1201-2 includes a VM host server 1401-2 and a data server 1501-2. The VM host server 1401-2 and the data server 1501-2 are connected over the network 1111.

The VM host server 1401-2 executes a virtual machine (VM) 1412-2, a hypervisor 1413-2, and an access client 1414-2.

The data server 1501-2 has chunks 1523-2-$r$ ($r$=1 to p) stored therein. The chunks 1523-2-$r$ are each a division of a file (data) that has a predetermined size.

Next, descriptions will be given of a file reading process performed by the distributed file system 1101 depicted in FIG. 1.

Figure 2:
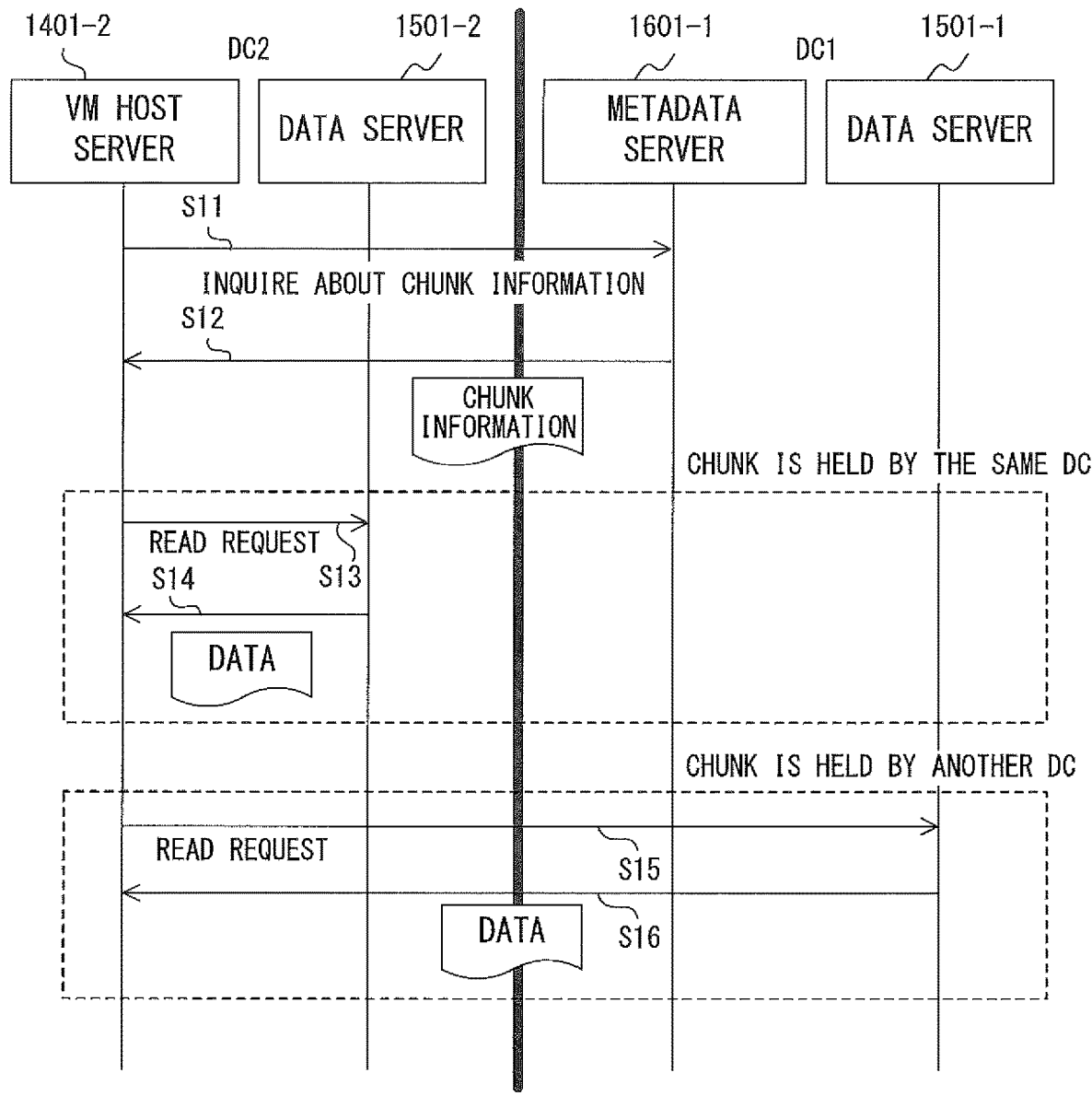
FIG. 2 is a sequence diagram of a reading process of a distributed file system.

FIG. 2 is a sequence diagram of a reading process of a distributed file system.

With reference to FIG. 2, the following describes a situation in which the access client 1414-2 of the VM host server 1401-2 reads a chunk that corresponds to a portion of a certain file.

The VM host server 1401-2 (access client 1414-2) inquires with the metadata server 1601-1 about information indicative of a chunk that corresponds to a desired portion of a file and about a data server that has the chunk stored therein (step S11).

According to the stored metadata 1622-1, the metadata server 1601-1 transmits, to the VM host server 1401-2, information on the chunk for which the inquiry has been made (step S12). The information on the chunk includes information indicative of the data server 1501-$i$ that has the chunk stored therein.

When the desired chunk is stored in the data server 1501-2, the following steps S13 and 214 are performed.

The VM host server 1401-2 (access client 1414-2) sends a chunk read request to the data server 1501-2 that has held the chunk (step S13).

The data server 1501-2 transmits the requested chunk to the VM host server 1401-2 (step S14).

When the desired chunk is stored in the data server 1501-1, the following steps S15 and S16 are performed.

The VM host server 1401-2 (access client 1414-2) sends a chunk read request to the data server 1501-1 that has held the chunk (step S15).

The data server 1501-1 transmits the requested chunk to the VM host server 1401-2 (step S16).

As described above, when the VM host server 1401-2 (access client 1414-2) is included in a DC that is different from the DC that includes the metadata server 1601-1 and the data server 1501-1, data is transmitted back and forth between the DCs at most twice every time the reading process is performed.

The following describes a file writing process performed by the distributed file system 1101 depicted in FIG. 1.

Figure 3:
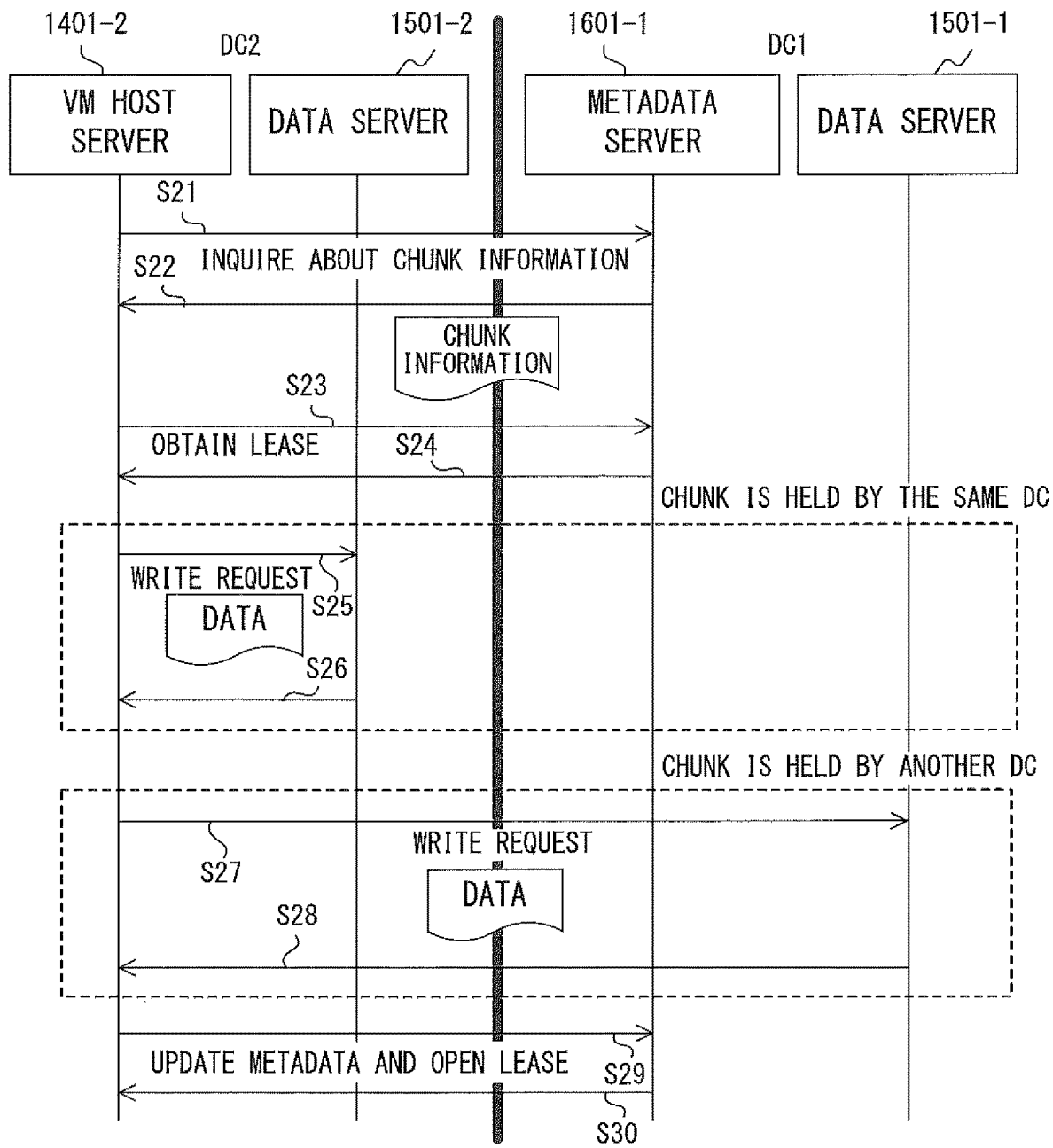
FIG. 3 is a sequence diagram of a writing process of a distributed file system.

FIG. 3 is a sequence diagram of a writing process of a distributed file system.

With reference to FIG. 3, the following describes a situation in which the access client 1414-2 of the VM host server 1401-2 writes a chunk that corresponds to a portion of a certain file.

The VM host server 1401-2 (access client 1414-2) inquires with the metadata server 1601-1 about information indicative of a chunk that corresponds to a desired portion of a file and about a data server 1501-$i$ that has the chunk stored therein. In writing additional data to the file, an inquiry is made about information indicative of a chunk to be newly created and about a data server 1501-$i$ in which the chunk is to be stored (step S21).

According to the stored metadata 1622-1, the metadata server 1601-1 transmits, to the VM host server 1401-2, information on the chunk for which the inquiry has been made (step S22).

Every time data is written to a chunk, the host server 1401-2 (access client 1414-2) makes a request for the met a data server 1601-1 to lock (lease) the chunk so as to prevent file integrity from being lost when data is simultaneously written to the same chunk in another server 1501-$i$ (step S23).

The metadata server 1601-1 grants a lease for the chunk to the VM host server 1401-2 and reports the lease for the chunk to the VM host server 1401-2 (step S24).

When a chunk to be updated by a write-target chunk is stored in the data server 1501-2, the following steps S25 and S26 are performed.

The VM host server 1401-2 (access client 1414-2) transmits a write request and the write-target chunk to the data server 1501-2 (step S25).

The data server 1501-1 stores the received chunk and reports the write completion to the VM host server 1401-2 (step S26).

When a chunk to be updated by the write-target chunk is stored in the data server 1501-1, the following steps S27 and S28 are performed.

The VM host server 1401-2 (access client 1414-2) transmits a write request and the write-target chunk to the data server 1501-1 (step S27).

The data server 1501-1 stores the received chunk and reports the write completion to the VM host server 1401-2 (step S28).

Upon the data writing being completed, the VM host server 1401-2 (access client 1414-2) makes a request for the metadata server 1601-1 to update metadata 1622-1 and to open the lease (step S29).

The metadata server 1601-1 reports the completion of updating of the metadata and the opening of the lease to the VM host server 1401-2 (step S30).

As described above, when the VM host server 1401-2 (access client 1414-2) is included in a DC that is different from the DC that includes the metadata server 1601-1 and the data server 1501-1, data needs to be transmitted back and forth between the DCs at most four times.

In the distributed FS depicted in FIG. 1, when an access client is included in a DC that is distant from, i.e., different from, a DC that, includes a metadata server and a data server, responses become slow in a communication between the access client and the data server or the metadata server that is performed to maintain integrity.

When DCs each have a file system (when a file system distributed among the DCs is not created), metadata is provided for each of the DCs, and hence the time needed to inquire about metadata becomes short. In this case, however, all of the files need to be transferred simultaneously, and the VM system needs to be stopped during data transfer; hence, a large file size leads to the stopping of the system for a long time.

The following describes an embodiment of the present invention by referring to the drawings.

Figure 4:
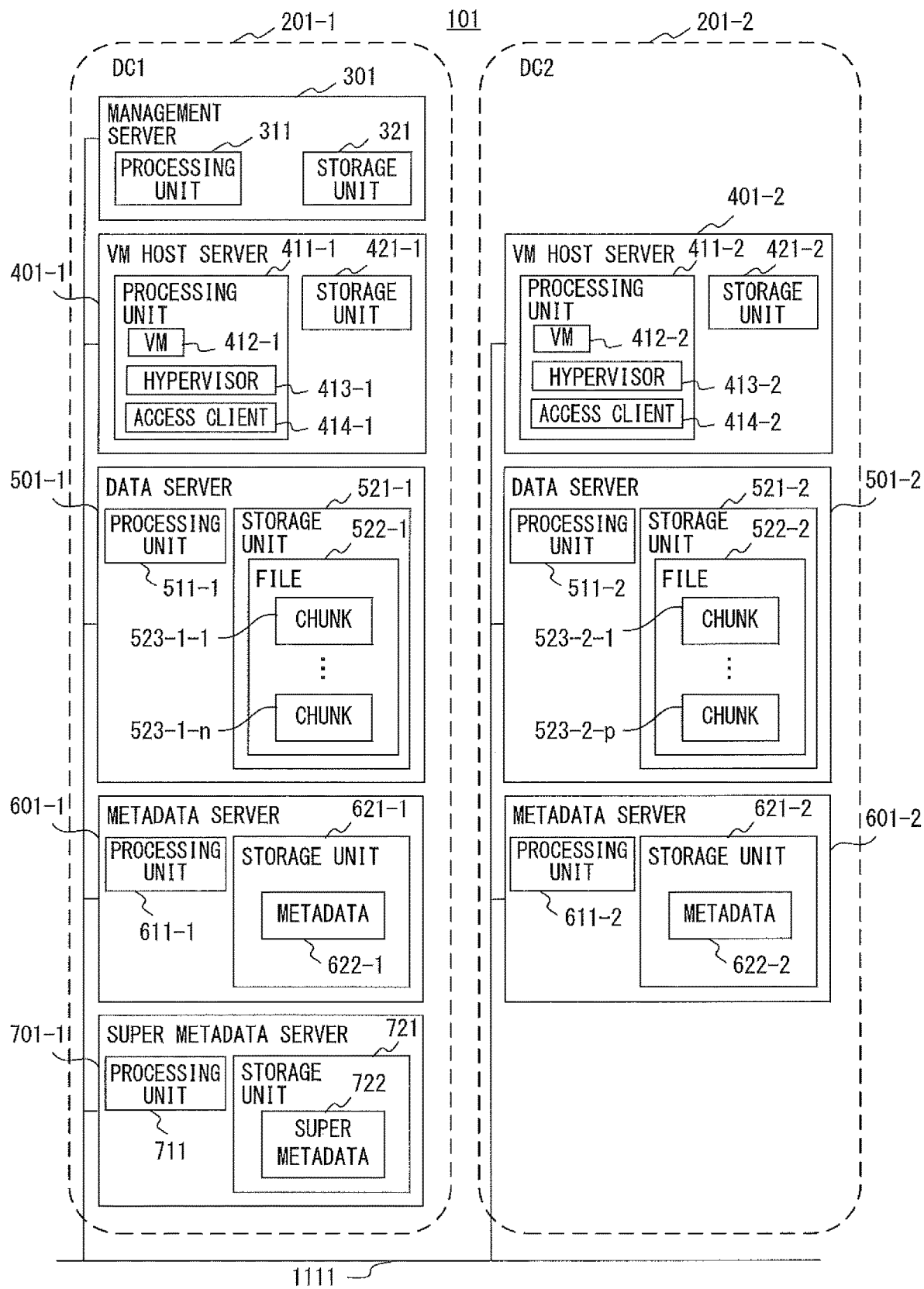
FIG. 4 is a configuration diagram of a distributed file system in accordance with an embodiment.

FIG. 4 is a configuration diagram of a distributed file system in accordance with an embodiment.

A distributed file system 1101 includes data centers (DCs) 201-$i$ ($i$=1, 2). The data centers 201-1 and 201-2 may hereinafter be referred to as a DC1 and a DC2, respectively. The data centers 201-1 and 201-2 are connected over a network 111.

The data center 201-1 includes a management server 301, a VM host server 401-1, a data server 501, a metadata server 601-1, and a super metadata server 701. The management server 301, the VM host server 401-1, the data server 501-1, the metadata server 601-1, and the super metadata server 701 are connected over the network 111.

The management server 301 includes a processing unit 311 and a storage unit 321.

The processing unit 311 manages chunk transfer and the like.

The storage unit 321 stores data and a program to be used by the management server 301.

The VM host server 401-1 includes a processing unit 411-1 and a storage unit 421-1.

The processing unit 411-1 executes a virtual machine (VM) 412-1, a hypervisor 413-1, and an access client 414-1. The VM 412-1 is a virtual apparatus achieved using an image file (VM image file) stored in a storage apparatus belonging to the VM 412-1. The processing unit 411-1 may include a plurality of VMs 412-1. The hypervisor 413-1 controls the VM 412-1. The access client 414-1 controls data transmission and reception between the VM 412-1 and a data server 501-$i$ or a metadata server 601-$i$.

The storage unit 421-1 has stored therein data and a program to be used by the VM host server 401-1.

The data server 501-1 includes a processing unit 511-1 and a storage unit 521-1.

The processing unit 511-1 performs processing such as the transmitting or receiving of chunks 523-1-$j$ ($j$=1 to n).

The storage unit 521-1 stores a file 522-1. The file 522-1 includes chunks 523-1-$j$. That is, the file 522-1 consists of the chunks 523-1-$j$. The file 522-1 is, for example, an image file stored in a storage apparatus belonging to a VM 412-$i$.

The metadata server 601-1 includes a processing unit 611-1 and a storage unit 621-1.

The processing unit 611-1 updates metadata 622-1 and grants a lease.

The storage unit 621-1 stores metadata 622-1. The metadata 622-1 is information related to the file 522-1. The metadata 622-1 includes information on a directory (inode), information on chunks that form the file and on chunk positions (allocation table), and information on a lock (lease) for the chunks (lock table). Details of the metadata 622-1 will be described hereinafter.

The super metadata server 701 includes a processing unit 711 and a storage unit 721.

The processing unit 711 performs processing such as the granting of a super lease.

The storage unit 721 has stored super metadata 722 therein. The super metadata 722 is information indicative of a metadata server that manages metadata 622-$i$ of a file 522-$i$. Details of the super metadata 722 will be described hereinafter.

The data center 201-2 includes a VM host server 401-2, a data server 501-2, and a metadata server 601-2. The VM host server 401-2, the data server 501-2, and the metadata server 601-2 are connected over a network 111.

The VM host server 401-2 includes a processing unit 411-2 and a storage unit 421-2.

The processing unit 411-2 executes a virtual machine (VM) 412-2, a hypervisor 413-2, and an access client 414-2. The VM 412-2 is a virtual apparatus achieved using an image file (VM image file) stored in a storage apparatus belonging to the VM 412-2. The processing unit 411-2 may include a plurality of VMs 412-1. The hypervisor 413-2 controls the VM 412-2. The access client 414-2 controls data transmission and reception between the VM 412-2 and a data server 501-$i$ or a metadata server 601-$i$.

The storage unit 421-2 has stored therein data and a program to be used by the VM host server 401-2.

The data server 501-2 includes a processing unit 511-2 and a storage unit 521-2.

The processing unit 511-2 performs processing such as the transmitting or receiving of chunks 523-2-$r$ ($r$=1 to p).

The storage unit 521-2 has stored a file 522-2 therein. The file 522-2 includes chunks 523-2-$r$. That is, the file 522-1 consists of the chunks 523-2-$r$. The file 522-2 is, for example, an image file stored in a storage apparatus belonging to a VM 412-$i$. The storage units 521-1 and 521-2 are shared between the VM host servers 401-1 and 402-2, and hence they can be accessed from both of the VM host servers 401-1 and 402-2.

The metadata server 601-2 includes a processing unit 611-2 and a storage unit 621-2.

The processing unit 611-2 updates metadata 622-2 and grants a lease.

The storage unit 621-2 has stored metadata 622-2 therein. The metadata 622-2 is information related to the file 522-2. The metadata 622-2 includes information on a directory (inode), information on chunks that form the file and on chunk positions (allocation table), and information on a lock (lease) for the chunks (lock table).

Figure 5:
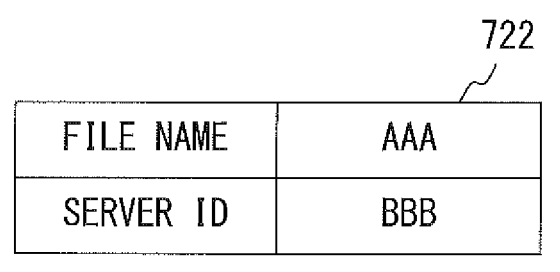

FIG. 5 illustrates an example of super metadata.

Super metadata 722 includes the items "file name" and "server ID". Super metadata 722 has registered therein a file name and a server ID associated with each other.

A file name is information for identification of a file 522-$i$, i.e., the name of the file 522-$i$.

A server ID is information indicative of a metadata server 501-$i$ that has an authority to manage metadata of a file 522-$i$ (super lease). A server ID indicates, for example, the name of a host that manages a metadata server 501-$i$.

FIG. 6 illustrates an exemplary allocation table from among metadata.

An allocation table 623-1 from among metadata 622-1 includes the items "file name", "chunk number", "data offset", "data length", and "server ID". The allocation table 623-1 has registered therein a file name, a chunk number, a data offset, a data length, and a server ID associated with each other.

A file name is information for identification of a file 522-$i$ formed by a chunk, and is also the name of the file 522-$i$.

A chunk number is information for identification of a chunk, and is also a number allocated to the chunk.

A data offset indicates the position of a chunk 523-1-$j$ within a file 522-$i$ and, in particular, indicates an offset from the head of a file 522-$i$ formed by a chunk 523-1-$j$.

A data length indicates the length (size) of a chunk 523-1-$j$.

A server ID is information indicative of a data server 501-$i$ that has held a chunk. The server ID is, for example, the name of a host that manages a data server 501-$i$.

The format of the allocation table of metadata 622-2 is similar to that of the allocation table 623-1 depicted in FIG. 6.

FIG. 7 illustrates an exemplary lock table from among metadata.

A lock table 624-1 from among metadata 622-1 includes items "file name", "chunk number", and "lease". The lock table 624-1 has registered therein a file name, a chunk number, and a lease associated with each other.

A file name is information for identification of a file 522-$i$ formed by a chunk 523-1-$j$, and is also the name of the file 522-$i$.

A chunk number is information for identification of a chunk 523-1-$j$, and is also a number allocated to the chunk 523-1-$j$.

A lease indicates whether a chunk 523-1-$j$ that corresponds to a chunk number has been locked. When the lease is "Yes", the lease has been granted to a VM host server 401-$i$ (access client 414-$i$), i.e., the chunk 523-1-$j$ that corresponds to the chunk number has been locked. When the lease is "No", the lease has not been granted, i.e., the chunk 523-1-$j$ that corresponds to the chunk number has not been locked.

The format of the lock table of metadata 622-2 is similar to that of the lock table 624-1 depicted in FIG. 7.

The following describes a super lease and a process of transferring of metadata.

Figure 8:
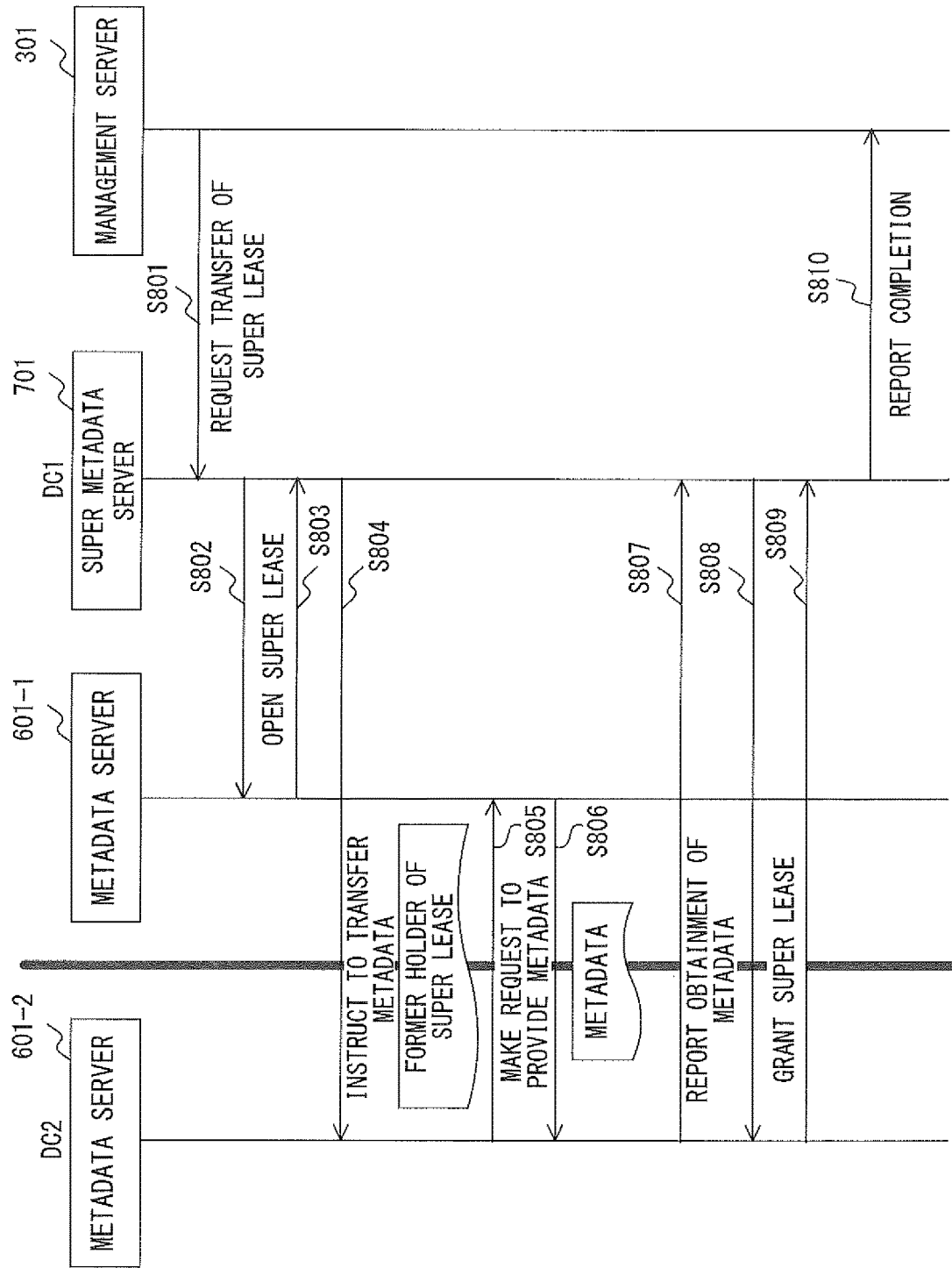
FIG. 8 is a sequence diagram of a metadata transferring process in accordance with an embodiment.

FIG. 8 is a sequence diagram of a metadata transferring process in accordance with an embodiment.

Assume that a certain file 522-1 has been transferred from a DC 1 to a DC 2 so that that file can be used mainly in the DC 2. In accordance with the transfer of the file 522-1, the metadata 622-1 of the transferred file 522-1 is also transferred from the DC 1 to the DC 2.

With reference to FIG. 8, descriptions will be given of a situation in which metadata 622-1 is transferred from a metadata server 601-1 in the DC 1 to a metadata server 601-2 in the DC 2.

A management server 301 (processing unit 311) makes a request for a super metadata server 701 to transfer the authority (super lease) to manage the metadata of the transferred file 522-1 (target file) from a metadata server 601-1 that currently has the super lease to a metadata server 601-2 (step S801).

The super metadata server 701 (processing unit 711) reports the opening of the super lease for the metadata of the target file to the metadata server 601-1, i.e., the metadata server 601-1 that currently has the super lease for the metadata of the target file (step S802).

Upon receipt of the report of the opening of the super lease, the metadata server 601-1 (processing unit 611-1) sends a response to the super metadata server 701 to report that the report has been received (step S803).

The super metadata server 701 (processing unit 711) transmits, to the metadata server 601-2, an instruction to transfer metadata 622-1 from the metadata server 601-1, i.e., the previous holder of the super lease (step S804).

Upon receipt of the instruction from the super metadata server 701, the metadata server 601-2 (processing unit 611-2) transmits, to the metadata server 601-1, a request to provide metadata 622-1 (step S805).

The metadata server 601-1 (processing unit 611-1) transmits metadata 622-1 to the metadata server 501-2 (step S806).

The metadata server 601-2 (processing unit 611-2) stores metadata 622-1 in a storage unit 521-2 and reports to the super metadata server 701 that metadata 622-1 has been obtained (step S807).

The super metadata server 701 (processing unit 711) reports to the metadata server 601-2 that the super lease for the metadata 622-1 of the file 522-1 has been granted (step S808).

The metadata server 601-2 (processing unit 611-2) transmits a response to the super metadata server 701 to report that the report of the granting of the super lease has been received (step S809).

The super metadata server 701 (processing unit 711) reports to the management server 301 that the transfer of the super lease has been completed (step S810).

For a newly created file, a super lease is granted to a metadata server in a data center where an access client that has created the file is present.

The following describes processing performed when a VM 412-2 reads a certain piece of data in accordance with an embodiment. A data read request from the VM 412-2 is transmitted to an access client 414-2 via a hypervisor 413-2, and the access client 414-2 reads data from a data server 501-2 and passes the read data to the VM 412-2. The read-target data is a file 522-2 or a portion of the file 522-2 and consists of one or more chunks 523-2-$r$.

Figure 9:
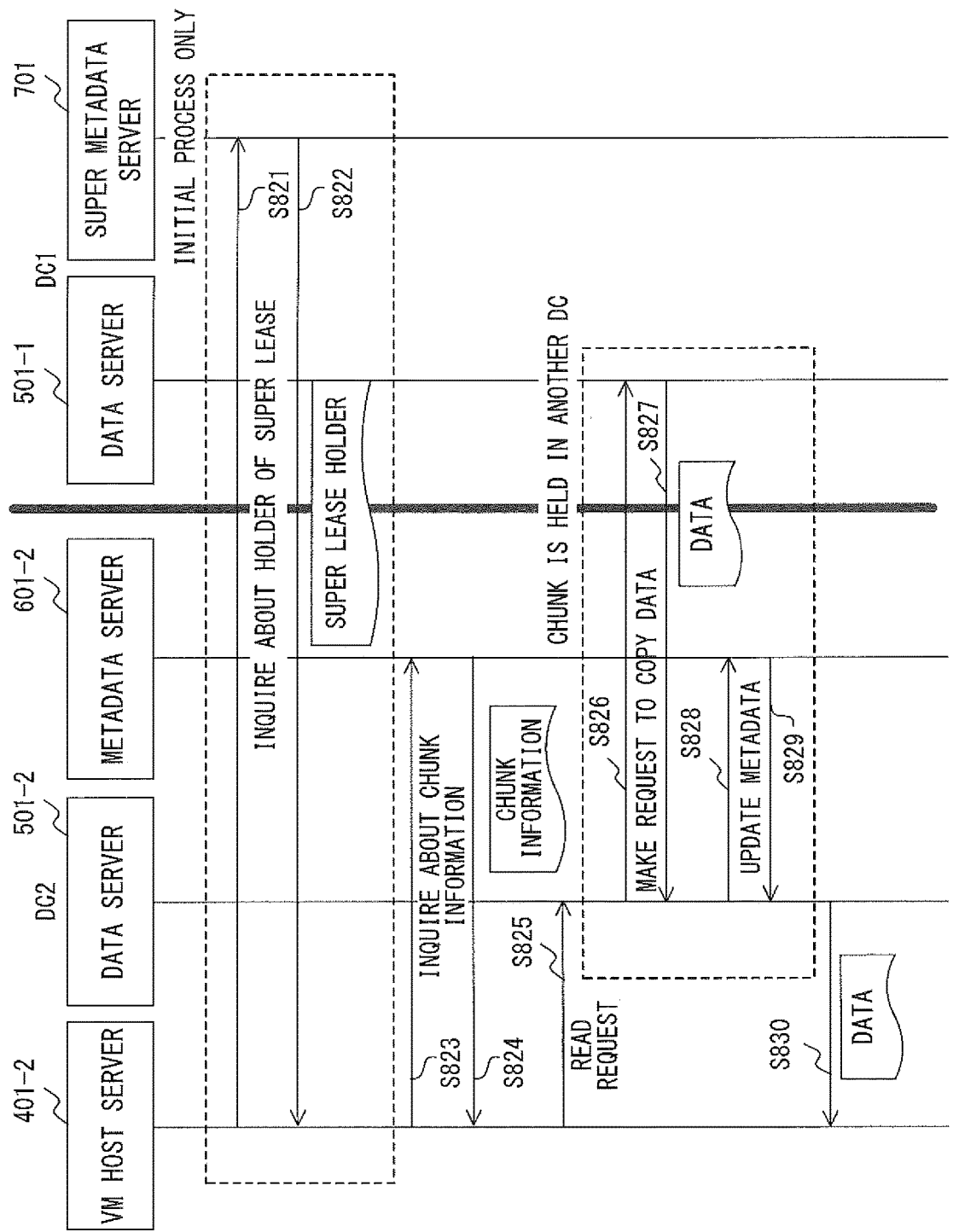
FIG. 9 is a sequence diagram of a data reading process in accordance with an embodiment.

FIG. 9 is a sequence diagram of a data reading process in accordance with an embodiment.

Assume that a VM 412-2 has output a read request for a certain piece of data. An access client 414-2 receives the read request via a hypervisor 413-2.

A VM host server 401-2 (access client 414-2) inquires with a super metadata server 701 about a metadata server that has held a super lease for the read-target data (step S821).

The super metadata server 701 (processing unit 711) reports the metadata server that has held a super lease for the read-target data to the VM host server 401-2 (step S822).

The VM host server 401-2 (access client 414-2) inquires with a metadata server 601-2 about chunk information of the read-target data (step S823).

The metadata server 601-2 (processing unit 611-2) transmits the chunk information to the VM host server 401-2 (step S824). The chunk information includes a server ID indicative of a data server 501-*i* that has stored therein a chunk that forms the read-target data.

The VM host server 401-2 (access client 414-2) transmits a read request for the read-target data to a data server 501-2 (step S825). The read request includes the server ID obtained from the chunk information, i.e., a server ID indicative of a data server 501-*i* that has stored therein a chunk that forms the read-target data.

When the read-target data is held in a data server 501-1 in a DC 1 that is different from the DC 2, in which the VM host server 401-2 is located, the processes of the following steps S826-S829 are performed.

The data server 501-2 (processing unit 511-2) transmits, to the data server 501-1, a request to provide the read-target data (step S826).

The data server 501-1 (processing, unit 511-2) transmits the read-target data to the data server 501-2, and the data server 501-2 (processing unit 511-2) stores the read-target data in a storage unit 521-2 (step S827).

The data server 501-2 (processing unit 511-2) instructs a metadata server 601-2 to update metadata of the read-target data (step S828).

The metadata server 601-2 (processing unit 611-2) updates the metadata of the read-target data. In particular, the metadata server 601-2 (processing unit 611-2) writes, to the metadata, information indicating that the data server 501-2 has the read-target data stored therein. The metadata server 601-2 (processing unit 611-2) reports the completion of updating to the data server 501-2 (step S829).

The data server 501-2 (processing unit 511-2) transmits the read-target data to the VM host server 401-2 (step S830). The access client 414-2 receives and passes the data to the VM 412-2.

Figure 10:
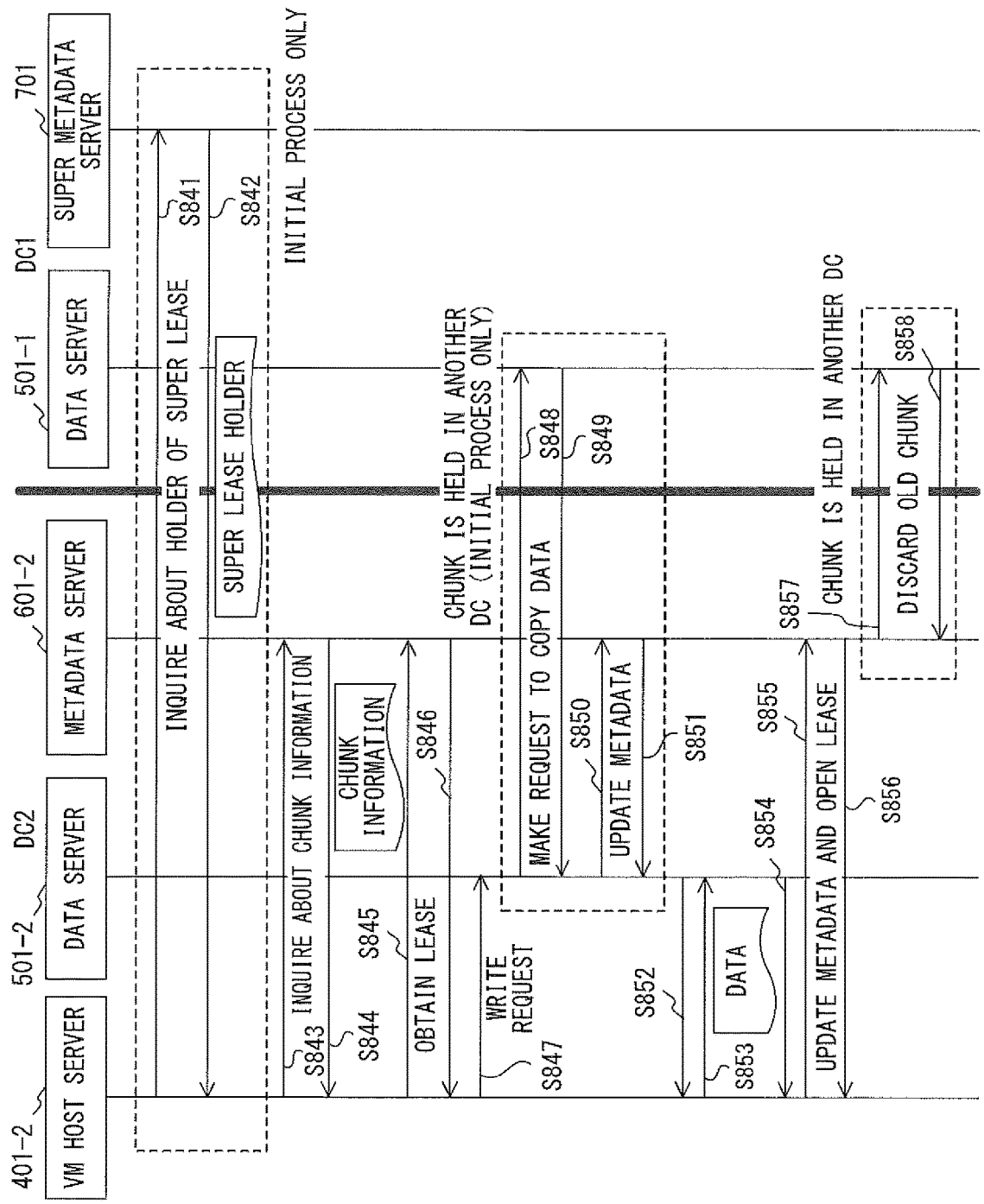
FIG. 10 is a sequence diagram of a data writing process in accordance with an embodiment.

FIG. 10 is a sequence diagram of a data writing process in accordance with an embodiment.

Assume that a VM 412-2 has output a write request for a certain piece of data, and a write-target chunk (data). An access client 414-2 receives the write request and the write-target chunk via a hypervisor 413-2.

A VM host server 401-2 (access client 414-2) inquires with a super metadata server 701 about a metadata server that has held a super lease for the write-target data (step S841).

The super metadata server 701 (processing unit 711) reports the metadata server that has held a super lease for the write-target data to the VM host server 401-2 (step S842).

The VM host server 401-2 (access client 414-2) inquires with a metadata server 601-2 about chunk information of the write-target data (step S843).

The metadata server 601-2 (processing unit 611-2) transmits the chunk information to the VM host server 401-2 (step S844).

The VM host server 401-2 (access client 414-2) makes a request for the metadata server 601-2 to grant a lease for the write-target data (step S845).

The metadata server 601-2 (processing unit 611-2) grants a lease for the write-target data to the VM host server 401-2 (access client 414-2) and reports the lease for the write-target data to the VM host server 401-2 (access client 414-2) (step S846).

The VM host server 401-2 transmits the write request to the data server 501-2 (step S847).

When a chunk to be updated by the write-target data is held in a data server 501-1 in a DC 1 that is different from the DC 2 in which the VM host server 401-2 is located, the following steps S848-S851 are initially performed and also the following steps S857 and S858 are performed.

The data server 501-2 (processing unit 511-2) makes a request for the data server 501-1 to copy the chunk to be updated by the write-target data (step S848).

The data server 501-1 (processing unit 511-1) transmits the chunk to be updated by the write-target data to the data server 501-2 (step S849).

The data server 501-2 (processing unit 511-2) makes a request for the metadata server 601-2 to update metadata 622-2 (step S850).

The metadata server 601-2 (processing unit 611-2) updates metadata 622-2 and reports the completion of updating to the data server 501-2 (step S851).

The data server 501-2 (processing unit 511-2) transmits a response to the VM host server 401-2 to report that data can be written (step S852).

The VM host server 401-2 (access client 414-2) transmits the write-target data to the data server 501-2 (step S853).

The data server 501-2 (processing unit 511-2) writes the write-target data to the storage unit 521-1 and reports the completion of writing to the VM host server 401-2 (step S854).

The VM host server 401-2 (access client 414-2) makes a request, for the metadata server 601-2 to update metadata 622-2 and to open the lease for the write-target data (step S855).

The metadata server 601-2 (processing unit 611-2) updates metadata 622-2, opens the lease for the write-target data, and reports the completion of updating of the metadata and the opening of the lease to the VM host server 401-2 (step S856).

The metadata server 601-2 (processing unit 611-2) instructs the data server 501-1 to discard a chunk updated by the write data, and the data server 501-1 (processing unit 511-1) discards the chunk (step S857).

The data server 501-1 (processing unit 511-1) reports the completion of the chunk discarding to the metadata server 601-2 (step S858).

The following describes a process performed when a VM in operation under a VM host server in a certain DC is transferred to another DC and is operated under a VM host server in this other DC, i.e., the destination.

Figure 11:
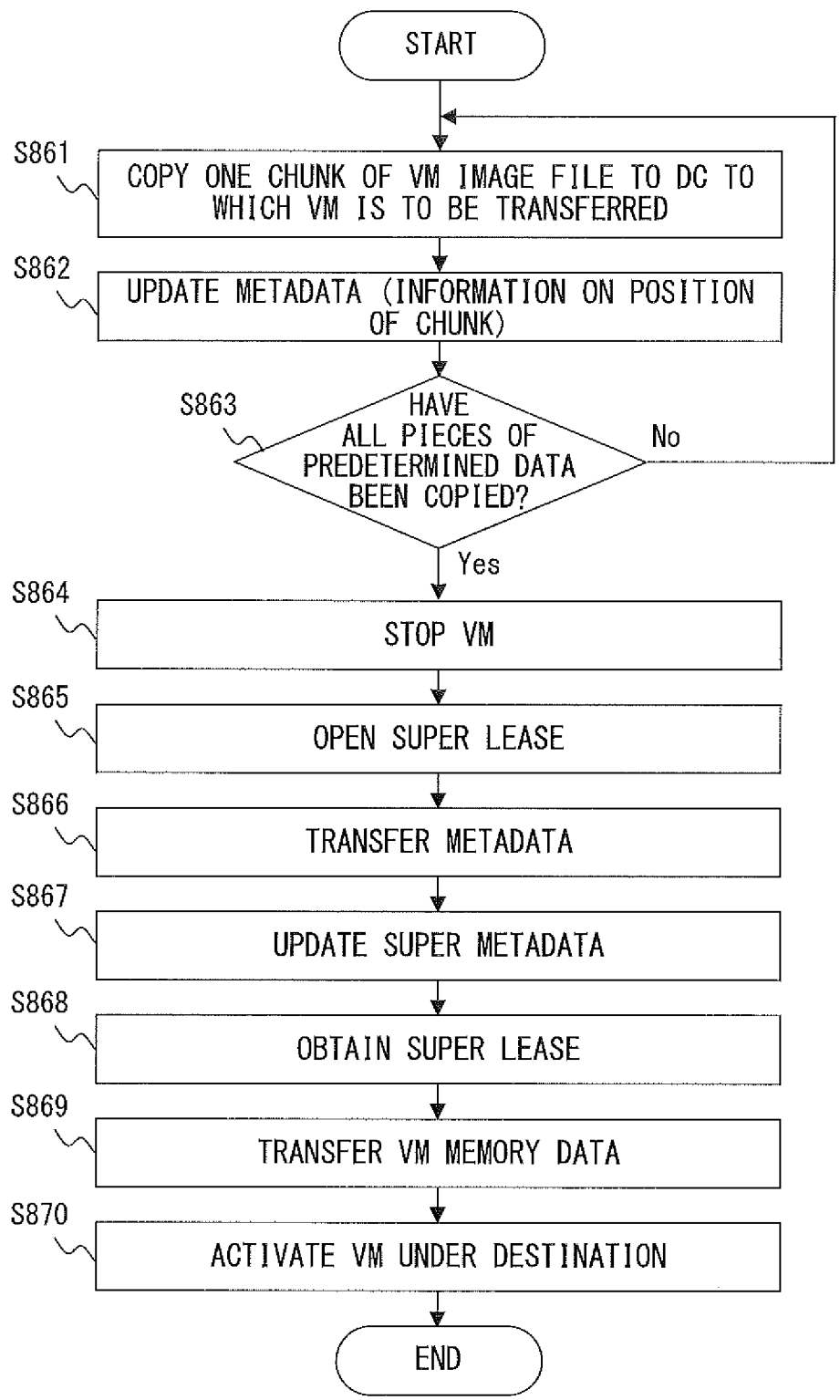
FIG. 11 is a flowchart of a VM transferring process in accordance with an embodiment.

FIG. 11 is a flowchart of a VM transferring process in accordance with an embodiment.

Assume that a VM 412-*i* is operated under a VM host server 401-*i* within a source DC 201-*i* and that the VM is achieved using an image file (VM image file) stored in a storage apparatus belonging to the VM 412-*i* that is stored in a data server 521-*i* within the source DC 201-*i*. The storage apparatus belonging to the VM 412-*i* has stored therein an OS, an application program, various types of data, and the like. The image file is a collection of a plurality of pieces of data stored in the storage apparatus. Hence, the image file stored in the storage apparatus belonging to the VM 412-*i* includes an operating system (OS), an application program, various types of data, and the like. The VM image file corresponds to, for example, the file 522-1. A VM 412-*i*, host server 401-*i*, data server 501-*i*, and metadata server 601-*i* that are included in the DC 201-*i* in which the VM 412-*i* was originally operated, are hereinafter referred to as a source VM host server 401-*i*, a source data server 501-*i*, and a source metadata server 601-*i*. A VM host server 401-*i*, data server 501-*i*, and metadata server 601-*i* that are included in a DC 201-*i* to which the VM 412-*i* is transferred, are hereinafter referred to as a destination VM host server 401-*i*, a destination data server 501-*i*, and a destination metadata server 601-*i*.

In step S861, the source data server 521-*i* (processing unit 511-*i*) transmits, to the destination data server 521-*i*, one chunk that has not been transmitted from among the chunks that form a VM image file, and the destination data server 521-*i* stores the receivers chunk in a storage unit 521-*i* (the chunk is copied). The transmitted chunk is, for example, a chunk that corresponds to data on an OS within a storage apparatus belonging to the VM 412-*i* from among the VM image file. The data on the OS, which is frequently read, is seldom updated and is thus preferentially transmitted.

In step S862, the source metadata server 601-*i* (processing unit 611-*i*) updates metadata 523-*i* of the transmitted chunk. In particular, the source metadata server 601-*i* (processing unit 611-*i*) updates the metadata 523-*i* to indicate the server ID of the destination data server 521-*i* as the server ID of the data server that holds the transmitted chunk.

When all pieces of predetermined data have been copied (i.e., when all pieces of predetermined data have been transmitted to the destination data server 521-*i*) in step S863, the control shifts to step S864. When all pieces of predetermined data have not been copied, the control returns to step S861. The predetermined data is, for example, a chunk that corresponds to data on an OS stored in a storage apparatus of the VM 412-*i* from among the VM image file.

In step S864, the VM host server 412-*i* for operating the VM 412-*i* stops the VM 412-*i*.

In step S865, the super metadata server 701 (processing unit 711) reports to the source metadata server 601-*i* that has held a super lease for the VM image file on the opening of the super lease.

In step S866, the source metadata server 601-*i* (processing unit 611-*i*) transmits the metadata 622-*i* of the VM image file to the destination metadata server 601-*i*. The destination metadata server 601-*i* (processing unit 611-*i*) stores the received metadata 622-*i* in the storage unit 621-*i*.

In step S867, the super metadata server 701 (processing unit 711) updates super metadata 722.

In step S868, the super metadata server 701 (processing unit 711) grants the super lease for the VM image file to the destination metadata server 601-*i*, and the destination metadata server 601-*i* obtains the super lease for the VM image file.

In step 869, the destination VM host server 401-*i* activates the VM 412-*i* using a VM image file that includes the chunk stored in the destination data server 521-*i*.

The following describes details of a VM transferring process using a sequence diagram.

Figure 12:
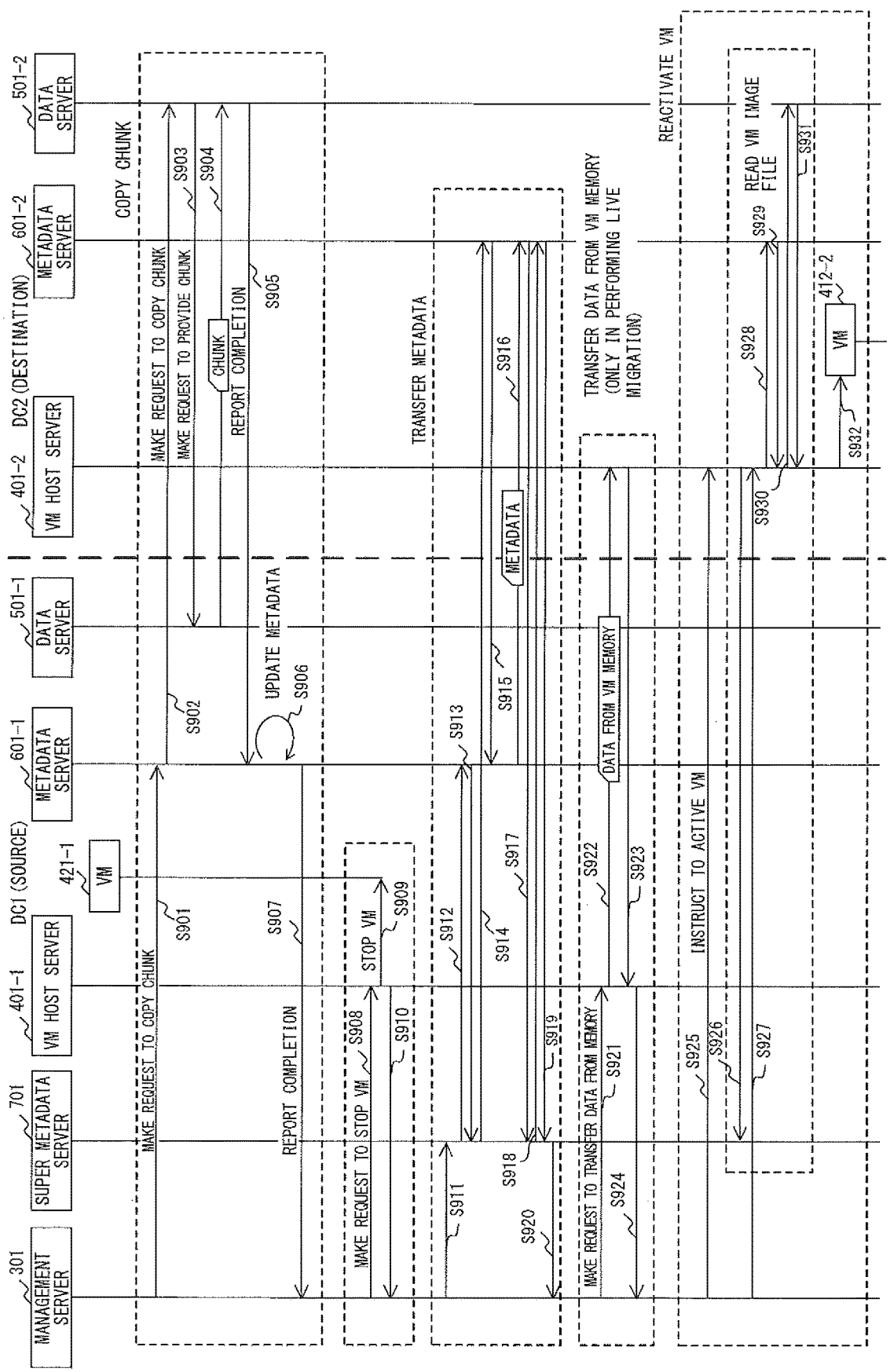
FIG. 12 is a sequence diagram of a VM transferring process in accordance with an embodiment.

FIG. 12 is a sequence diagram of a VM transferring process in accordance with an embodiment.

With reference to FIG. 12, descriptions will be given of a situation in which a virtual machine 412-1 operated in a source DC 1 is transferred to a destination DC 2.

A management server 301 (processing unit 311) makes a request for a metadata server 601-*i* to copy a chunk that corresponds to predetermined data (step S901). In this example, the predetermined data is data on an OS from among an image file stored in a storage apparatus belonging to the virtual machine 412-1 that has the OS, an application program, and various types of data stored therein.

A metadata server 601-1 (processing unit 611-1) makes a request for a data server 501-2 to copy the chunk that corresponds to the predetermined data (step S902).

The data server 501-2 (processing unit 511-2) makes a request for a data server 501-1 to provide the chunk that corresponds to the predetermined data (step S903).

The data server 501-1 (processing unit 511-1) transmits the chunk that corresponds to the predetermined data to the data server 501-2 (step S904).

The data server 501-2 (processing unit 511-2) reports to the metadata server 601-1 on the completion of the chunk copying (step S905).

The metadata server 601-1 (processing unit 611-1) updates metadata 622-1 (step S906).

The metadata server 601-2 (processing unit 611-1) reports to the management server 301 on the completion of the chunk copying (step S907).

The management server 301 (processing unit 311) makes a request for a VM host server 401-1 to stop the VM 412-1 (step S908).

The VM host server 401-1 (processing unit 411-1) stops the VM 412-1 (step S909).

The VM host server 401-1 (processing unit 411-1) reports to the management server 301 that, the VM 412-1 has been completely stopped (step S910).

The management server 301 (processing unit 311) makes a request for the super metadata server 701 to transfer the authority (super lease) to manage the metadata of a transferred file 522-1 (target file) from the metadata server 601-1 that currently has the super lease to the metadata server 601-2 (step S911).

The super metadata server 701 (processing unit 711) reports the opening of the super lease for the target file to the metadata server 601-1 that has the super lease for the target file (step S912).

Upon receipt of the report of the opening of the super lease, the metadata server 601-1 (processing unit 611-1) sends a response to the super metadata server 701 to report that the report has been received (step S913).

The super metadata server 701 (processing unit 711) transmits, to the metadata server 601-2, an instruction to transfer metadata 622-1 from the metadata server 601-1 i.e., the previous holder of the super lease (step S914).

Upon receipt of the instruction from the super metadata server 701, the metadata server 601-2 (processing unit 611-2) transmits, to the metadata server 601-1, a request to provide metadata 622-1 (step S915).

The metadata server 601-1 (processing unit 611-1) transmits metadata 622-1 to the metadata server 601-2 (step S916).

The metadata server 601-2 (processing unit 611-2) stores metadata 622-1 in a storage unit 521-2 and reports to the super metadata server 701 that metadata 622-1 has been obtained (step S917).

The super metadata server 701 (processing unit 711) reports to the metadata server 601-2 that the super lease for the metadata 622-1 of the file 522-1 has been granted (step S918).

The metadata server 601-2 (processing unit 611-2) transmits a response to the super metadata server 701 to report that the report of the granting of the super lease has been received (step S919).

The super metadata server 701 (processing unit 711) reports to the management server 301 that the transfer of the super lease has been completed (step S920).

The following steps S921-S924 are performed in performing live migration.

The management server 301 (processing unit 311) makes a request for the VM host server 401-1 to transfer data on a memory of the virtual machine 412-1 (step S921).

The VM host server 401-1 (processing unit 411-4) transmits the data on the memory of the virtual machine 412-1 to the VM host server 401-2 (step S922).

The VM host server 401-2 (processing unit 411-2) reports to the VM host server 401-1 that the receiving of the data on the memory of the virtual machine 412-1 has been completed (step S923).

The VM host server 401-1 (processing unit 411-1) reports to the management server 301 that the transferring of the data on the memory of the virtual machine 412-1 has been completed (step S924).

The management server 301 (processing unit 311) instructs the VM host server 401-2 to activate a virtual machine 412-2 (step S925).

The VM host server 401-2 (access client 414-2) inquires with the super metadata server 701 about a metadata server that has held a super lease for an image file of the virtual machine 412-2 (step S926).

The super metadata server 701 (processing unit 711) reports the metadata server that has held the super lease for the image file of the virtual machine 412-2 to the VM host server 401-2 (step S927).

The VM host server 401-2 (access client 414-2) inquires with the metadata server 601-2 about chunk information of a chunk that forms the image file of the virtual machine 412-2 (step S928).

The metadata server 601-2 (processing unit 611-2) transmits the chunk information to the VM host server 401-2 (step S929).

The VM host server 401-2 (access client 414-2) transmits a read request for the image file of the virtual machine 412-2 to the data server 501-2 (step S930).

The data server 501-1 (processing unit 511-1) transmits the image file of the virtual machine 412-2 to the VM host server 401-2 (step S931).

Using the chunk of the image file of the virtual machine 412-1, i.e., a virtual machine that was operated under the VM host server 401-1, that is stored in the data server 501-2, the VM host server 401-2 (processing unit 411-2) activates the virtual machine 412-2 on the VM host server 401-2. In performing live migration, the virtual machine 412-2 is executed using the data obtained in step S922, i.e., data on the memory of virtual machine 412-1. As a result, the virtual machine 412-2, which is similar to the virtual machine 412-1 that was operated under the VM host server 401-1 in the source DC 1, is operated under the VM host server 401-2 in the destination DC 2.

Figure 13:
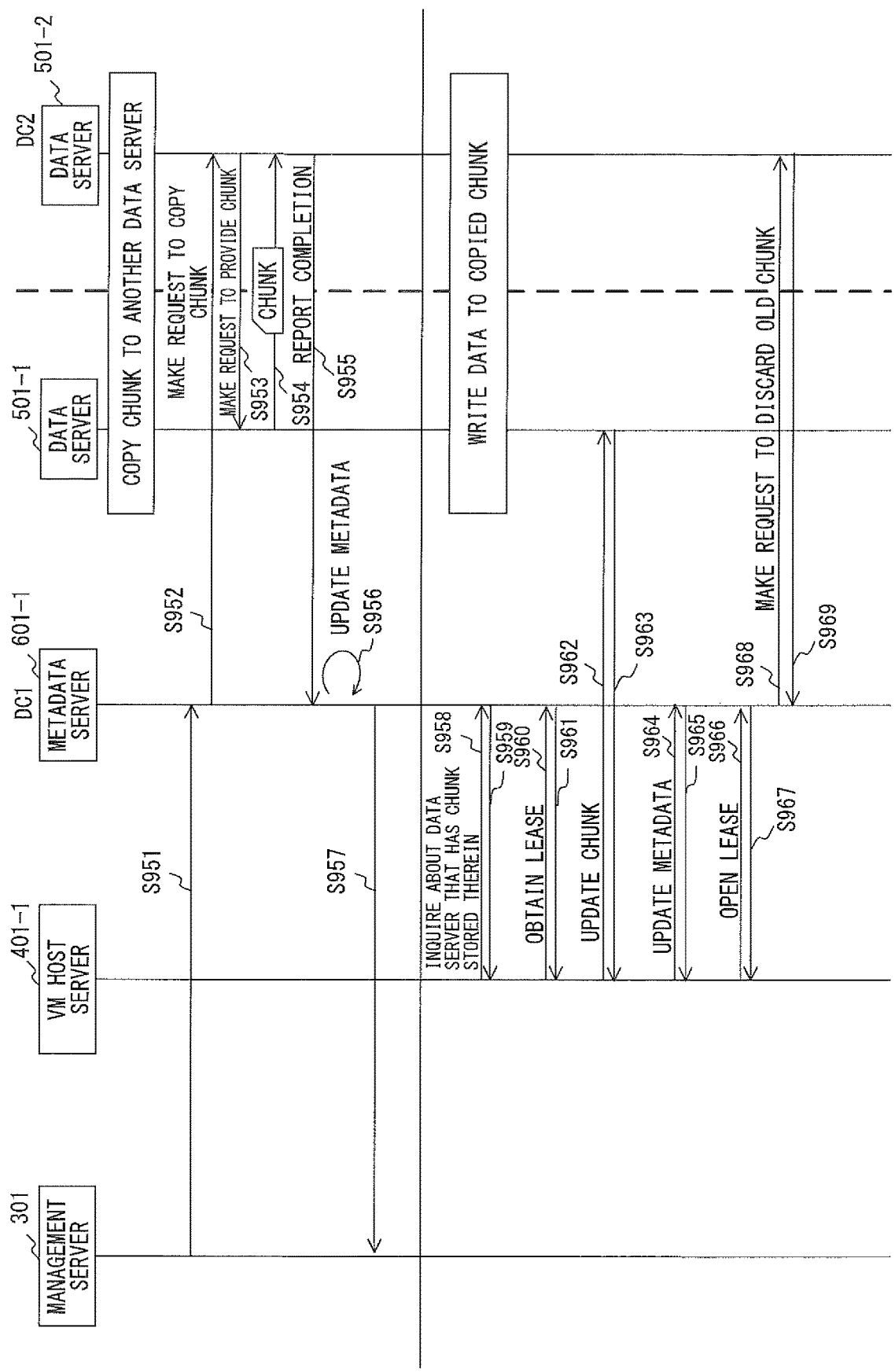
FIG. 13 is a sequence diagram of a process preformed when data is updated while being transferred.

FIG. 13 is a sequence diagram of a process preformed when data is updated while being transferred.

With reference to FIG. 13, descriptions will be given of a process performed when a chunk that corresponds to predetermined data is copied to a destination data server 501-2 and then the chunk in a source data server 501-1 is updated.

A management server 301 (processing unit 311) makes a request for a metadata server 601-1 to copy a chunk that corresponds to predetermined data (step S951).

The metadata server 601-1 (processing unit 611-1) makes a request for the data server 501-2 to copy the chunk that corresponds to the predetermined data (step S952).

The data server 501-2 (processing unit 511-2) makes a request for the data server 501-1 to provide the chunk that corresponds to the predetermined data (step S953).

The data server 501-1 (processing unit 511-1) transmits the chunk that corresponds to the predetermined data to the data server 501-2 (step S954). The data server 501-2 (processing unit 511-2) stores the received chunk in the storage unit 522-2.

The data server 501-2 (processing unit 511-2) reports to the metadata server 601-1 on the completion of the chunk copying (step S955).

The metadata server 601-1 (processing unit 611-1) updates metadata 622-1 (step S956). In particular, the metadata server 601-1 (processing unit 611-1) records, in metadata 622-1, the fact that the chunk that corresponds to the predetermined data has been copied to the data server 501-2.

The metadata server 601-1 (processing unit 611-1) reports to the management server 301 on the completion of the chunk copying (step S957).

The processes of steps S951-S957 described above are similar to the processes of steps S901-S907 in FIG. 12, respectively.

The following describes a situation in which a certain chunk (update-target chunk) is updated from among the chunks that are stored in a data server 501-1 and that have been copied to a data server 501-2.

A VM host server 401-1 (access client 414-1) inquires with a metadata server 601 about a data server that has the update-target chunk stored therein (step S958).

According to metadata 622-1, the metadata server 601-1 (processing unit 611-1) reports to the VM host server 401-1 on the data server that has the update-target chunk stored therein (step S959). In this example, the data server 501-1 is reported as the data server that has the update-target chunk stored therein.

The VM host server 401-1 (access client 414-1) makes a request for the metadata server 601-1 to grant a lease for the update-target chunk (step S960).

The metadata server 601-1 (processing unit 611-1) grants the lease for the update-target chunk to the VM host server 401-1 and reports the lease for the update-target chunk to the VM host server 401-2 (step S961).

The VM host server 401-1 (access client 414-1) transmits a write request and data for updating the update-target chunk to the data server 501-1 (step S962). The data server 501-1 (processing unit 511-1) updates the update-target chunk stored in the storage unit 522-2 using the received data.

The data server 501-1 (processing unit 511-1) reports the completion of updating to the VM host server 401-1 (step S963).

The VM host server 401-1 (access client 414-1) makes a request for the metadata server 601-1 to update metadata 621-1 related to the update-target chunk (step S964).

The metadata server 601-1 (processing unit 611-2) updates the metadata 622-1 and reports the completion of updating to the VM host server 401-1 (step S965). In particular, since the chunks corresponding to the update-target chunk that have been copied to the data server 501-2 are old, the metadata server 601-1 (processing unit 611-2) deletes from the metadata 622-1 the fact that the update-target chunk has been copied to the data server 501-2.

The VM host server 401-1 (access client 414-1) makes a request for the metadata server 601-1 to open the lease for the update-target chunk (step S966).

The metadata server 601-1 (processing unit 611-1) opens the lease for the update-target chunk and reports the opening of the lease to the VM host server 401-1 (step S867).

The metadata server 601-1 (processing unit 611-2) transmits to the data server 501-2 a request to discard a chunk that corresponds to the update-target chunk (step S968).

The data server 501-2 (processing unit 511-2) discards a chunk stored in the storage unit 522-2 that corresponds to the update-target chunk, and reports the completion of the discarding to the metadata server 601-1 (step S969).

In transferring a virtual machine, the distributed file system in accordance with each embodiment allows the image file of the virtual machine to be transferred to a destination without stopping the operation of the virtual machine, thereby shortening a stop time of the virtual machine.

Moreover, before a virtual machine is activated under a destination DC, the distributed file system in accordance with each embodiment transfers the metadata of the image file of the virtual machine to the destination DC, thereby preventing the response performance of the virtual machine from being decreased after the reactivation.

Figure 14:
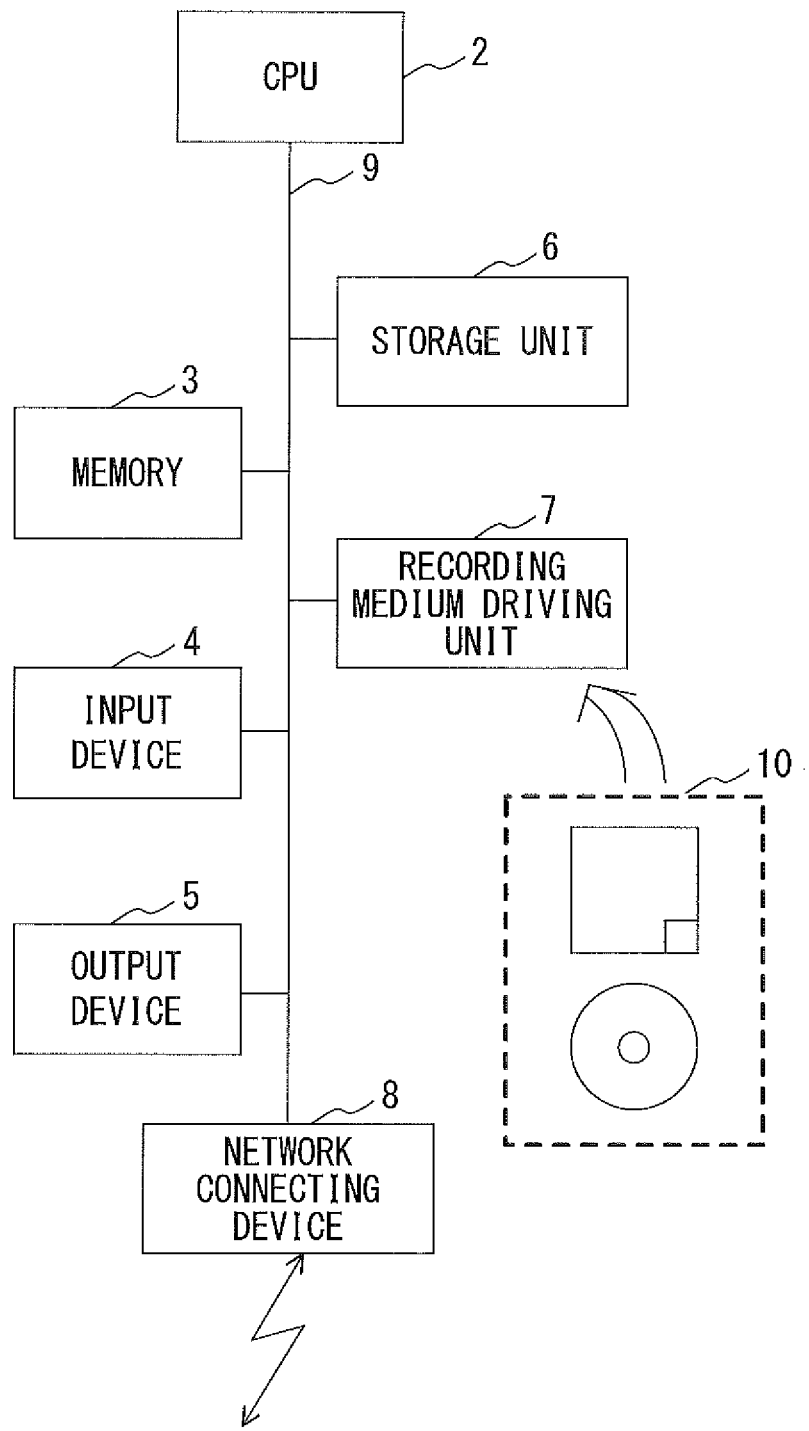
FIG. 14 is a configuration diagram of an information processing apparatus (computer).

FIG. 14 is a configuration diagram of an information processing apparatus (computer).

A management server 301-*i*, a VM host server 401-*i*, a data server 501-*i*, a metadata server 601-*i*, and a super metadata server 701 in accordance with an embodiment may be achieved by, for example, an information processing device (computer) 1 depicted in FIG. 14.

The information processing device 1 includes a Central Processing Unit (CPU) 2, a memory 3, an input device 4, an output device 5, a storage unit 6, a recording medium driving unit 7, and a network connecting unit 8, all of which are connected to each other by a bus 9.

The CPU 2 is a central processor that controls the entirety of the information processing device 1. The CPU 2 is operated as processing units 311, 411-*i*, 511-*i*, 611-*i*, and 711.

The memory 3 is a memory such as a Read Only Memory (ROM) or a Random Access Memory (RAM) that, in program execution, temporarily stores a program or data stored in the storage unit 6 (or a portable recording medium 10). The CPU 2 performs the various processes described above by executing a program using the memory 3.

In this case, a program code itself read from, for example, the portable recording medium 10 achieves functions of an embodiment.

The input device 4 is used to, for example, input information or an instruction from a user or an operator and obtain data to be used for the information processing apparatus 1. The input device 4 is, for example, a keyboard, a mouse, a touch panel, a camera, or a sensor.

The output device 5 outputs a query or a result of processing to a user or an operator and is operated under the control of the CPU 2. The output device 5 is, for example, a display or a printer.

The storage unit 6 is, for example, a magnetic disk device, an optical disk device, or a tape device. The information processing device 1 stores the program and data described above in the storage unit 6 and loads them into the memory 3 for use on an as-needed basis. The memory 3 and the storage unit 6 correspond to storage units 321, 421-*i*, 521-*i*, 621-*i*, and 721.

The recording medium driving unit 7 drives the portable recording medium 10 and accesses data recorded therein. An arbitrary computer-readable recording medium such as a memory card, a flexible disk, a Compact Disk Read Only Memory (CD-ROM), an optical disk, or a magnetic optical disk is used as the portable recording medium. The user stores the program and data described above in the portable recording medium 10 and loads them into the memory 3 for use on an as-needed basis.

The network connecting unit 8 is a communication interface that is connected to arbitrary communication networks such as a Local Area Network (LAN) or a Wide Area Network (WAN) and that performs data conversion associated with communications. The network connecting unit 8 transmits/receives data to/from a device connected over a communication network.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
    a first data center;
    a second data center; and
    a super metadata server,
    the first data center includes
        a first virtual machine server that includes a first processor that executes a virtual machine using an image file of a storage device belonging to the virtual machine,
        a first data server that includes a second processor and a first storage that has stored therein a plurality of chunks that form the image file, and
        a first metadata server that includes a third processor and a second storage that has metadata of the image file stored therein, the metadata including position information representing a position of each chunk in the image file,
    the second data center includes
        a second virtual machine server that includes a fourth processor that executes the virtual machine using the image file,
        a second data server that includes a third storage and a fifth processor, and
        a second metadata server that includes a sixth processor and a fourth storage that has the metadata stored therein,
    the super metadata server includes
        a fifth storage that has stored therein information indicative of an apparatus that has an authority to manage the metadata, and
        a seventh processor that transfers the authority from the first metadata server to the second metadata server when the metadata is transmitted to the second metadata server and is stored in the fourth storage,
    the second processor transmits, to the second data center, a predetermined chunk of the plurality of chunks that corresponds to predetermined data stored in the storage device,
    the fifth processor stores the predetermined chunk in the third storage,
    the first processor stops the virtual machine operated under the first processor after the predetermined chunk is transmitted,
    the third processor transmits the metadata to the second metadata server after the first processor stops the virtual machine operated under the first processor,
    the sixth processor stores the metadata in the fourth storage, and
    the fourth processor activates the virtual machine using the image file that includes the predetermined chunk stored in the third storage.

2. The information processing system according to claim 1, wherein the predetermined data is data on an operating system of the virtual machine.

3. An information processing method to be executed by an information processing system that includes a first data center, a second data center and a super metadata server,
the first data center includes
a first virtual machine server that executes a virtual machine using an image file of a storage device belonging to the virtual machine,
a first data server that has stored therein a plurality of chunks that form the image file, and
a first metadata server that has metadata of the image file stored therein, the metadata including position information representing a position of each chunk in the image file,
the second data center includes
a second virtual machine server,
a second data server, and
a second metadata server,
the super metadata server wants authority to manage the metadata,
the information processing method comprising:
transmitting, by the first data center, to the second data center, a predetermined chunk of the plurality of chunks that corresponds to predetermined data stored in the storage device;
storing, by the second data center, the predetermined chunk;
stopping, by the first virtual machine server, the virtual machine after the predetermined chunk is transmitted;
transmitting, by the first metadata server, the metadata to the second metadata server after the first virtual machine server stops the virtual machine;
storing, by the second metadata server, the metadata;
transferring, by the super metadata server, the authority from the first metadata server to the second metadata server when the metadata is transmitted to the second metadata server and is stored by the second metadata server; and
activating, by the second virtual machine server, the virtual machine using the image file that includes the predetermined chunk stored in the second data server.

4. The information processing method according to claim 3, wherein the predetermined data is data on an operating system of the virtual machine.

5. An information processing system comprising:
a first data center; and
a second data center,
the first data center includes
a first virtual machine server that includes a first processor that executes a virtual machine using an image file of a storage device belonging to the virtual machine,
a first data server that includes a second processor and a first storage that has stored therein a plurality of chunks that form the image file, and
a first metadata server that includes a third processor and a second storage that has metadata of the image file stored therein, the metadata including position information and server identification information, the position information representing a position of each chunk in the image file, the server identification information indicating a data server that holds each chunk,
the second data center includes
a second virtual machine server that includes a fourth processor that executes the virtual machine using the image file,
a second data server that includes a third storage and a fifth processor, and
a second metadata server that includes a sixth processor and a fourth storage that has the metadata stored therein,
the second processor transmits, to the second data center, a predetermined chunk of the plurality of chunks that corresponds to predetermined data stored in the storage device,
the fifth processor stores the predetermined chunk in the third storage,
the first processor stops the virtual machine operated under the first processor after the predetermined chunk is transmitted,
the third processor transmits the metadata to the second metadata server after the first processor stops the virtual machine operated under the first processor,
the sixth processor stores the metadata in the fourth storage, and
the fourth processor activates the virtual machine using the image file that includes the predetermined chunk stored in the third storage.

* * * * *